United States Patent [19]

Memishian

[11] Patent Number: 5,659,262

[45] Date of Patent: Aug. 19, 1997

[54] OFFSET TRIMMING FOR A MICROMACHINED SENSING DEVICE

[75] Inventor: John Memishian, Newton, Mass.

[73] Assignee: Analog Devices, Inc., Norwood, Mass.

[21] Appl. No.: 616,749

[22] Filed: Mar. 15, 1996

[51] Int. Cl.$^6$ ................................................ H03L 5/00
[52] U.S. Cl. ............................................. 327/307; 327/111
[58] Field of Search ............................. 327/307, 51, 108, 327/111

[56] References Cited

U.S. PATENT DOCUMENTS

| | | | |
|---|---|---|---|
| 3,883,812 | 5/1975 | Harrison et al. | 327/494 |
| 4,062,417 | 12/1977 | Kunz | 177/212 |
| 5,122,755 | 6/1992 | Nootbaar et al. | 324/678 |
| 5,325,065 | 6/1994 | Bennett et al. | 327/100 |
| 5,343,766 | 9/1994 | Lee | 73/862.61 |
| 5,345,824 | 9/1994 | Sherman et al. | 73/517 B |

OTHER PUBLICATIONS

Analog Devices, Inc., 1995, Rev. 0, "+1g to +5g Single Chip Accelerometer With Signal Conditioning" ADXL05*.

Analog Devices, Inc., Rev. A, "Monolithic Accelerometer With Signal Conditioning" ADXL50*.

*Primary Examiner*—Toan Tran
*Attorney, Agent, or Firm*—Hale and Dorr LLP

[57] ABSTRACT

A micromachined device has first, second, and third electrodes forming a differential capacitor, and first and second drivers for providing clocked signals to the first and second electrodes. The drivers each have supply leads coupled to first and second reference voltage supplies via fixed first and second resistors, and also coupled together with variable resistors for trimming an offset so that electrostatic forces are balanced.

10 Claims, 2 Drawing Sheets

OFFSET TRIMMING FOR A MICROMACHINED SENSING DEVICE

FIELD OF THE INVENTION

This invention relates to circuitry and methods for offset trimming in a micromachined differential capacitor.

BACKGROUND OF THE INVENTION

In one type of known micromachined sensing device as shown in U.S. Pat. No. 5,345,824, which is hereby expressly incorporated by reference for all purposes, a mass is suspended over a substrate and is tethered to move along a sensitive axis. The mass has a central beam that is elongated in the direction of the sensitive axis and has fingers extending away from the central beam in a direction perpendicular to the sensitive axis. Each of these fingers is between a pair of stationary fingers, and together each movable finger and its adjacent stationary fingers form a differential capacitor.

FIG. 1 is a schematic of a differential capacitor 10 that has stationary outer electrodes 12, 14 and a movable inner electrode 16. Electrodes 12, 14 are coupled to DC voltage supplies that provide 3.4 volts and 0.2 volts, respectively, and electrode 16 has a DC voltage of 1.8 volts. Electrodes 12, 14 are also coupled through respective capacitors C1, C2 to clock signals 18, 20. Signals 18, 20 have a small peak-to-peak voltage of about 0.6 volts and have the same frequency, but each is 180° of out of phase from the other. As electrode 16 moves toward one or the other of electrodes 12, 14 (e.g., in response to an external force), a signal appears on electrode 16 and at its output node 22. This signal follows one or the other of signals 18, 20 and has a peak-to-peak amplitude that is proportional to the displacement of electrode 16.

SUMMARY OF THE INVENTION

The present invention provides a circuit and method for trimming an offset in a device that has first, second, and third electrodes which form a differential capacitor with the third electrode between and movable relative to the first and second electrodes. First and second drivers provide clocked signals to the respective first and second electrodes, with the clocked signals alternating between first and second reference voltages at the same frequency, but 180° out of phase. These clock signals have amplitudes that are large compared to prior devices (such as that shown in FIG. 1) to improve the signal-to-noise ratio. The reference voltage supplies are each coupled to supply leads of the drivers via a resistor. In at least one driver, the supply leads are also coupled together via a variable resistor. Preferably, there are two variable resistors, one for each driver, in which case one or both variable resistors can be adjusted to alter the reference voltages received by the driver(s).

The present invention thus provides a circuit for conveniently trimming an offset from a differential capacitor sensor in a manner that does not create AC forces on a movable electrode. Additionally, after the offset is trimmed, the method and circuit of the present invention balance electrostatic forces between the electrodes. Other features and advantages will become apparent from the following detailed description, the drawings, and the claims.

DETAILED DESCRIPTION

Figure 1:
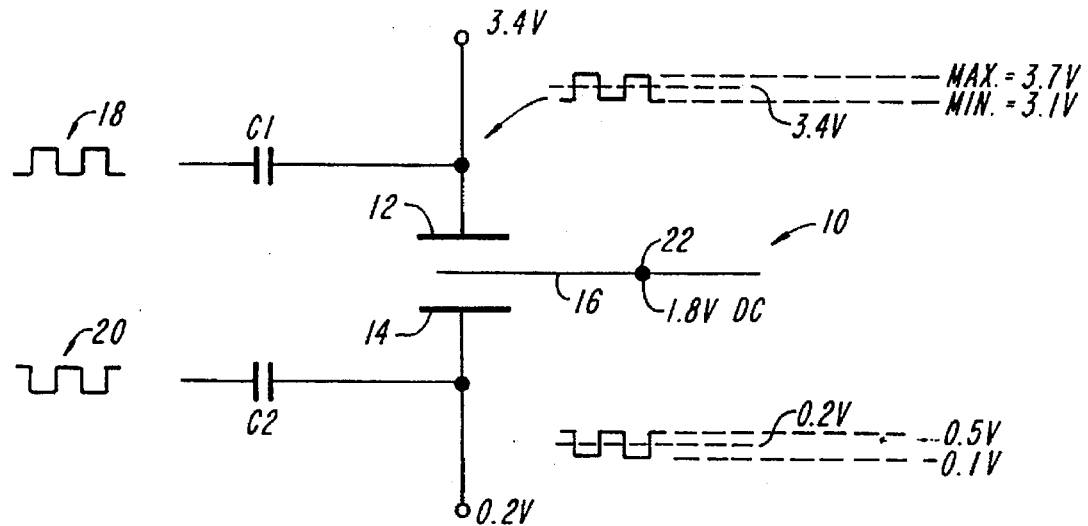
FIG. 1 is a schematic of a differential capacitor with circuitry for driving the outer electrodes.
Figure 2:
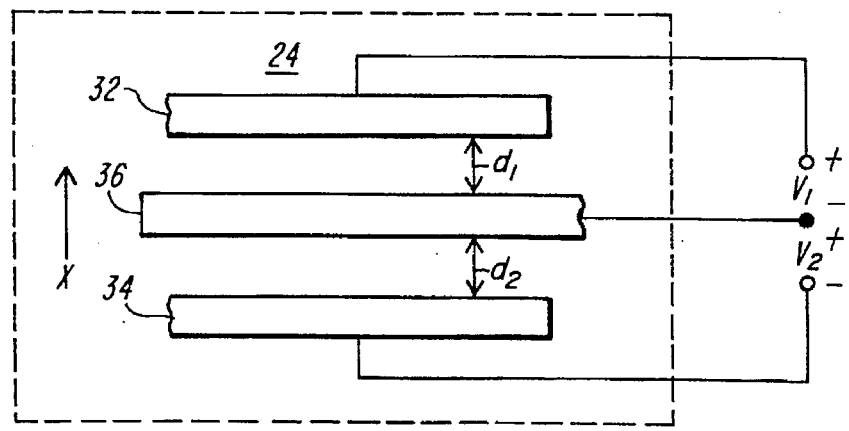
FIG. 2 is a plan view of a differential capacitor in a sensor.
Figure 3:
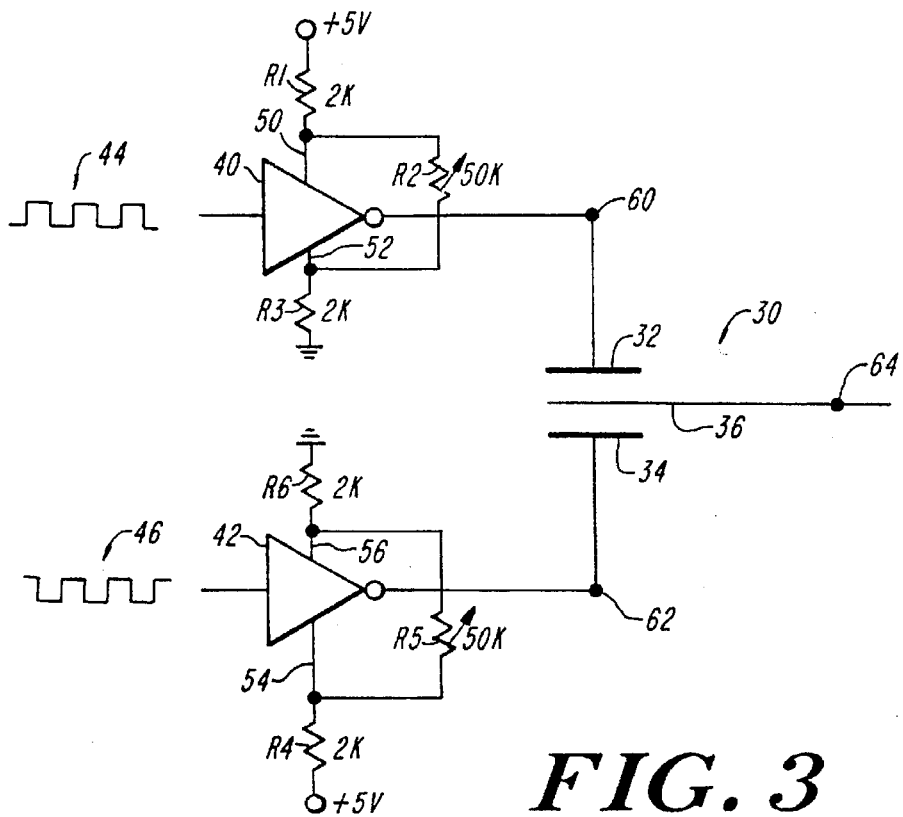
FIG. 3 is a schematic of a differential capacitor with drivers and offset trimming circuitry according to the present invention.

Referring to FIGS. 2 and 3, according to the present invention, a differential capacitor 30 has stationary electrodes 32, 34 and a movable electrode 36, which is centered between electrodes 32, 34 when electrode 36 is in a neutral position. As shown in FIG. 2, electrodes 32, 34, and 36 are preferably implemented as three elongated beams arranged in parallel and suspended over an underlying substrate 24 so that the electrostatic forces between electrode 36 and electrodes 32, 34 are functions of $V_1^2/d_1^2$ and $V_2^2/d_2^2$, respectively.

Electrodes 32, 34 receive signals from drivers 40, 42, which receive square waves 44, 46 that have approximately equal amplitude, equal frequency, and are 180° out of phase with respect to each other. Each driver 40, 42 is also coupled to two reference voltage supplies, e.g., 5 volts and ground, to set the minimum and maximum values of the signals provided to electrodes 32, 34. Driver 40 has first and second reference voltage input leads 50, 52 coupled to a 5 volt supply and to ground through respective resistors R1 and R3. Input leads 50, 52 are also coupled together through a variable resistor R2. Similarly, driver 42 has first and second reference voltage input leads 54, 56 coupled to a 5 volt supply and to ground through respective resistors R4 and R6. Input leads 54, 56 are also coupled together through a variable resistor R5.

In a preferred embodiment, R1=R3=R4=R6=2 kohms, while resistors R2 and R5 each have an initial value of 50 kohms. Resistors R2, R5 can each be formed on a surface of a chip and can be trimmed with a laser or with one of a number of other generally known techniques. Such surface resistors typically can only be trimmed to increase resistance, so it is desirable for each driver to have a corresponding variable resistor. While resistors R2, R5 can both be trimmed, it is preferred that only one of resistors R2, R5 be trimmed.

Alternatively, one or both of variable resistors R2, R5 can be a potentiometer; if the differential capacitor and drivers are formed on a single chip, one or both of resistors R2, R5 can be off chip and connected on chip through bond pads.

To perform trimming, a signal at node 64 is observed. With no force, this should be a 2.5 volt signal with no AC component. While observing the signal at node 64, one of resistors R2 and R5 is varied until there is no AC signal at node 64.

Drivers 40, 42 can be implemented with any device that receives a clocked input signal and first and second reference voltages and provides a clocked output that alternates between the first and second reference voltages. Examples of such a driver include a CMOS inverter and a CMOS single pole, double throw switch.

Figure 4:
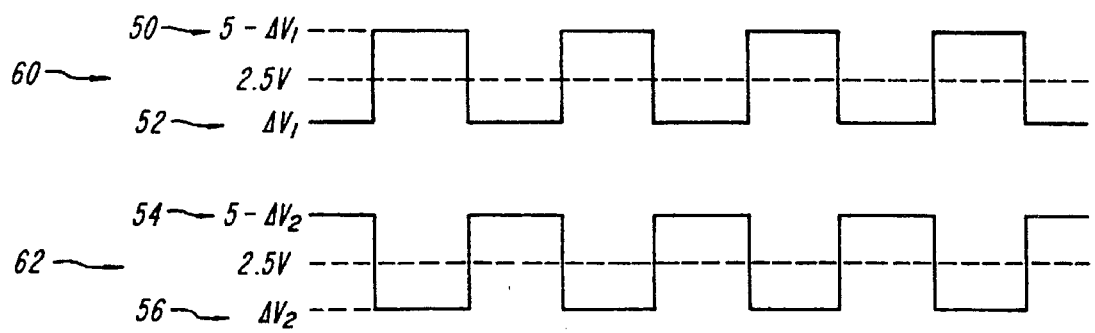
FIG. 4 is a pair of graphs of signals provided to electrodes of the differential capacitor.

FIG. 4 shows signals at nodes 60 and 62. With the circuit of FIG. 3, these signals provided to electrodes 32 and 34 each alternate from a value slightly higher than ground to a value slightly less than 5 volts. In each case, the minimum and maximum value is an equal difference (in absolute value) from the 2.5 volt DC voltage present on electrode 36, i.e., on both halves of the clock cycle, the magnitude is the same. Therefore, the clock amplitudes can be varied as necessary to adjust the offset without any AC force appearing on inner electrode 16.

With the trimming performed according to the present invention, when the device is trimmed so that there is no AC signal on node 64, $V_1/d_1=V_2/d_2$, thus equalizing static forces that exist between movable electrode 36 and each of electrodes 32, 34.

While the circuit is preferably provided with a device such as that shown in the incorporated patent, i.e., a surface micromachined accelerometer, it can be used with other devices that have a differential capacitor for sensing.

Having described the preferred embodiment of the present invention, it should be apparent that other modifications can be made without departing from the scope of the appended claims. While certain reference voltages and resistances have been stated in the exemplary embodiment, these values are illustrative and can have different values. If the resistor could be varied to increase or decrease resistance, one may be needed only for one driver.

What is claimed is:

1. An apparatus for connection to first and second reference voltage supplies, the apparatus comprising:
    a differential capacitor formed from first, second, and third electrodes, with the third electrode between, and movable relative to, the first and second electrodes;
    a first resistor;
    a second resistor having the same resistance as the first resistor;
    a first driver that provides a clocked signal to the first electrode, the first driver including:
        a first voltage supply lead for coupling to a first reference voltage supply via the first resistor, and
        a second voltage supply lead for coupling to a second reference voltage supply via a second resistor;
    a first variable resistor coupled to the first and second voltage supply leads;
    a third resistor;
    a fourth resistor having the same resistance as the third resistor;
    a second driver that provides a clocked signal to the second electrode, the second driver including:
        a third voltage supply lead for coupling to a third reference voltage supply via the third resistor, and
        a fourth voltage supply lead for coupling to a fourth reference voltage supply via the fourth resistor; and
    a second variable resistor coupled to the third and fourth voltage supply leads.

2. The apparatus of claim 1, wherein the third electrode has a DC voltage whose value is equal to an arithmetic mean of the first and second reference voltages.

3. The apparatus of claim 1, wherein the first, second, third, and fourth resistors are fixed resistors of equal value.

4. A micromachined device comprising:
    a substrate;
    first, second, and third beams suspended over the substrate and forming a differential capacitor with the third beam between and movable relative to the first and second beams;
    a first driver coupled to the first beam and having first and second voltage inputs such that the first driver provides to the first beam a first clocked signal alternating between the voltages of the first and second voltage inputs;
    a first variable resistor coupled across the first and second voltage inputs to the first driver;
    a second driver coupled to the second beam and having third and fourth voltage inputs such that the second driver provides to the second beam a second clocked signal alternating between the voltages of the third and fourth voltage inputs; and
    a second variable resistor coupled to the first and second voltage inputs to the second driver.

5. The device of claim 4, wherein at least one of the variable resistors is a laser trimmable resistor formed over the substrate.

6. The apparatus of claim 1, wherein the first reference voltage supply has the same voltage as the third reference voltage supply, and wherein the second reference voltage supply has the same voltage as the fourth reference voltage supply.

7. The device of claim 4, wherein the first and second voltage inputs of each of the first and second drivers are coupled to reference voltage supplies through respective resistors.

8. The device of claim 7, wherein the resistors coupled to the supplies all have equal resistances.

9. The device of claim 4, wherein the third beam is at a DC voltage whose value is an arithmetic mean of the first and second voltage inputs.

10. A method for use with a differential capacitor having first and second outer electrodes and an inner electrode that is between and movable relative to the first and second outer electrodes, the inner electrode being spaced from the first outer electrode by a distance $d_1$, and from the second outer electrode by a distance $d_2$, such that distance $d_1$ does not equal distance $d_2$, the inner electrode having a DC voltage $V_B$, the method comprising steps of:
    providing to the first outer electrode a square wave signal of period T, with a magnitude alternating between voltages $V_1$ and $V_2$, such that $V_1-V_B=V_B-V_2$; and
    providing to the second outer electrode a square wave signal of period T, with a magnitude alternating between voltages $V_3$ and $V_4$, such that $V_3-V_B=V_B-V_4$; wherein $(V_1-V_B)/d_1=(V_3-V_B)/d_2$.

* * * * *